United States Patent [19]

Hardy

[11] Patent Number: 5,221,043
[45] Date of Patent: Jun. 22, 1993

[54] OUTSIDE WASTE OIL FURNACE

[75] Inventor: Willie J. Hardy, Phildelphia, Miss.

[73] Assignee: Hardy Manufacturing Company, Inc., Philadelphia, Miss.

[21] Appl. No.: 692,661

[22] Filed: Apr. 29, 1991

[51] Int. Cl.⁵ .............................. F24D 3/08
[52] U.S. Cl. ...................... 237/19; 237/57; 431/207
[58] Field of Search ............ 237/16, 50, 53, 17, 237/36, 57, 13, 56, 19, 66; 126/101, 350 R; 431/207, 208

[56] References Cited

U.S. PATENT DOCUMENTS

| | | | |
|---|---|---|---|
| 1,577,428 | 3/1926 | Staples | 431/207 |
| 1,658,412 | 2/1928 | Parker | 237/66 |
| 4,390,007 | 6/1983 | Paquete | 431/207 |
| 4,768,495 | 9/1988 | Zifferer | 237/19 |
| 5,080,579 | 1/1992 | Specht | 431/207 |

Primary Examiner—Henry A. Bennet
Attorney, Agent, or Firm—Jacobson, Price, Holman & Stern

[57] ABSTRACT

A furnace located outside of a building or other enclosure to be heated with the furnace utilizing waste oil as a combustible fuel. The furnace is associated with a storage tank for the oil which includes a preheater or warmer therein as well as an oil preheater located in the oil supply line between the tank and furnace with the oil preheater being located adjacent the furnace and being preheated by the hot water produced by the furnace with the preheater or warmer in the tank also being communicated with the hot water heated by the furnace to reduce the viscosity thereof to facilitate the oil being pumped to the preheater and furnace. The hot water produced by the furnace can be used to heat water to be used for domestic purposes through a heat exchanger and also provide fan coil units with hot water and many other purposes. The furnace includes a unique arrangement of combustion chamber, heat transfer chambers and stack or chimney with a water jacket including a condenser unit to retain and condense water vapor or steam produced by the furnace.

12 Claims, 2 Drawing Sheets

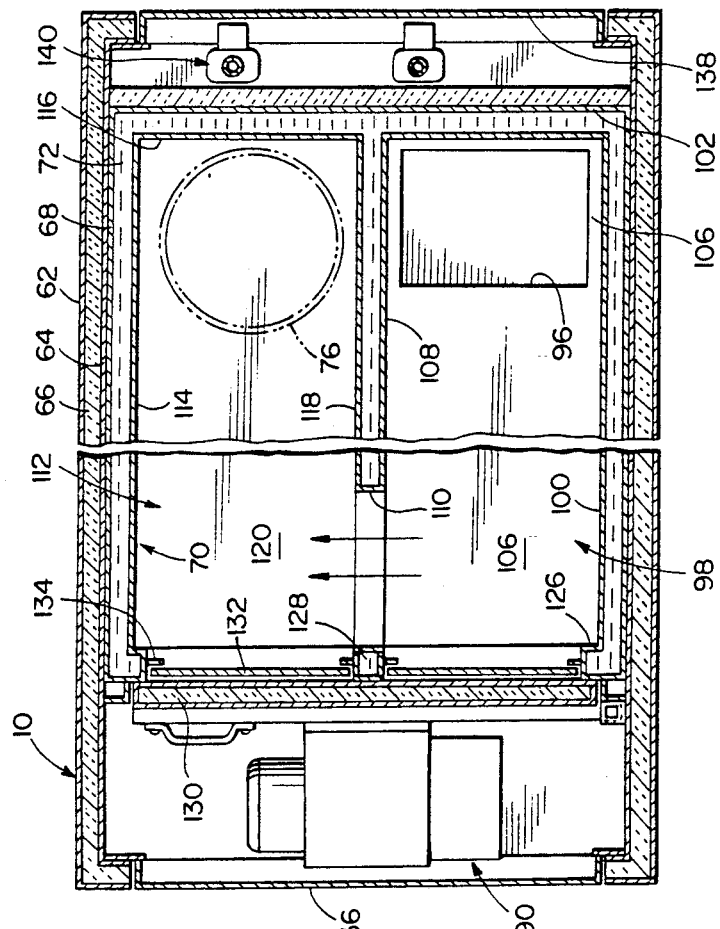
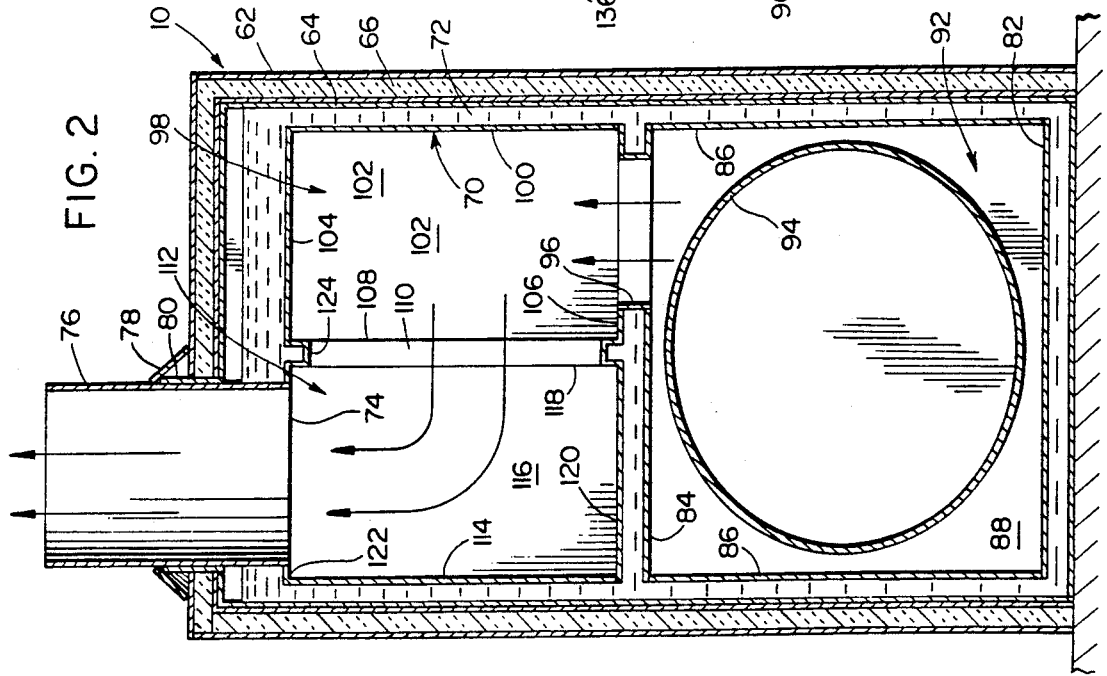

OUTSIDE WASTE OIL FURNACE

BACKGROUND OF THE INVENTION

1. Field of the Invention

The present invention relates to a furnace to provide a supply of heated water for various uses and purposes and more specifically a furnace located outside of a building or other enclosure to be heated with the furnace utilizing waste lubricating oil as a combustible fuel. The furnace is associated with a storage tank for the oil which includes a preheater or warmer therein as well as an oil preheater located in the oil supply line between the tank and furnace with the oil preheater being located adjacent the furnace and being preheated by the hot water produced by the furnace with the preheater or warmer in the tank also being communicated with the hot water heated by the furnace to reduce the viscosity thereof to facilitate the oil being pumped to the preheater and furnace. The hot water produced by the furnace can be used to heat water to be used for domestic purposes through a heat exchanger and also provide fan coil units with hot water and for many other purposes. The furnace includes a unique arrangement of combustion chamber, heat exchange chambers and stack or chimney with a water jacket including a condenser unit to retain and condense water vapor or steam produced by the furnace.

2. Description of the Prior Art

The prior U.S. Pat. No. 4,360,003 issued Nov. 23, 1982 discloses an outside wood burning furnace or hot water heater which includes a combustion chamber and a water jacket associated therewith and a heat exchange coil for heating domestic water and the like. This patent and the prior art patents of record therein are incorporated herein by reference thereto. The prior patents do not disclose the structure and arrangement of the outside waste oil furnace of the present invention and does not include structure enabling waste oil to be used as a fuel.

SUMMARY OF THE INVENTION

Disposal of used lubricating oil has been an ongoing problem and recent Governmental regulations set forth specific requirements and liabilities relating to proper disposal of waste oil. While some waste oil is cleaned and recycled for other lubricating uses, the volume of waste oil continues to increase along with the problems of disposal. Accordingly, it is an object of the present invention to provide an outside waste oil furnace which converts a waste oil disposal problem into a source of heat by providing a safe and clean method of disposing of waste oil thereby eliminating potential for liability due to mishandling of oil disposal and providing an economical source of fuel for heating water for various purposes.

Another object of the invention is to provide an outside waste oil furnace that includes an arrangement for preheating oil within a storage tank to reduce the viscosity thereof to enable it to be more easily pumped to a burner unit forming a part of the furnace with an in-line oil preheater being provided in the oil supply line between the storage tank and burner unit in the furnace.

Another object of the present invention is to provide an outside waste oil furnace which utilizes an atomization burner which cleanly burns the waste oil with the furnace including a structure which efficiently transfers the heat of combustion of the waste oil to the water by the use of a water jacket incorporated into the furnace with the water jacket including a condenser communicated with the upper end of the water jacket to recover water vapor that may have evaporated from the non-pressurized water jacket.

A further object of the invention is to provide an outside waste oil furnace in accordance with the preceding objects which provides an efficient utilization of heat energy from waste oil of various types and which can be easily installed and maintained to provide domestic hot water or hot water for various heating purposes.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a vertical sectional view of the furnace illustrating the flow path of combustion gases.

FIG. 3 is a horizontal sectional view of the furnace.

DESCRIPTION OF THE PREFERRED EMBODIMENT

Figure 1:
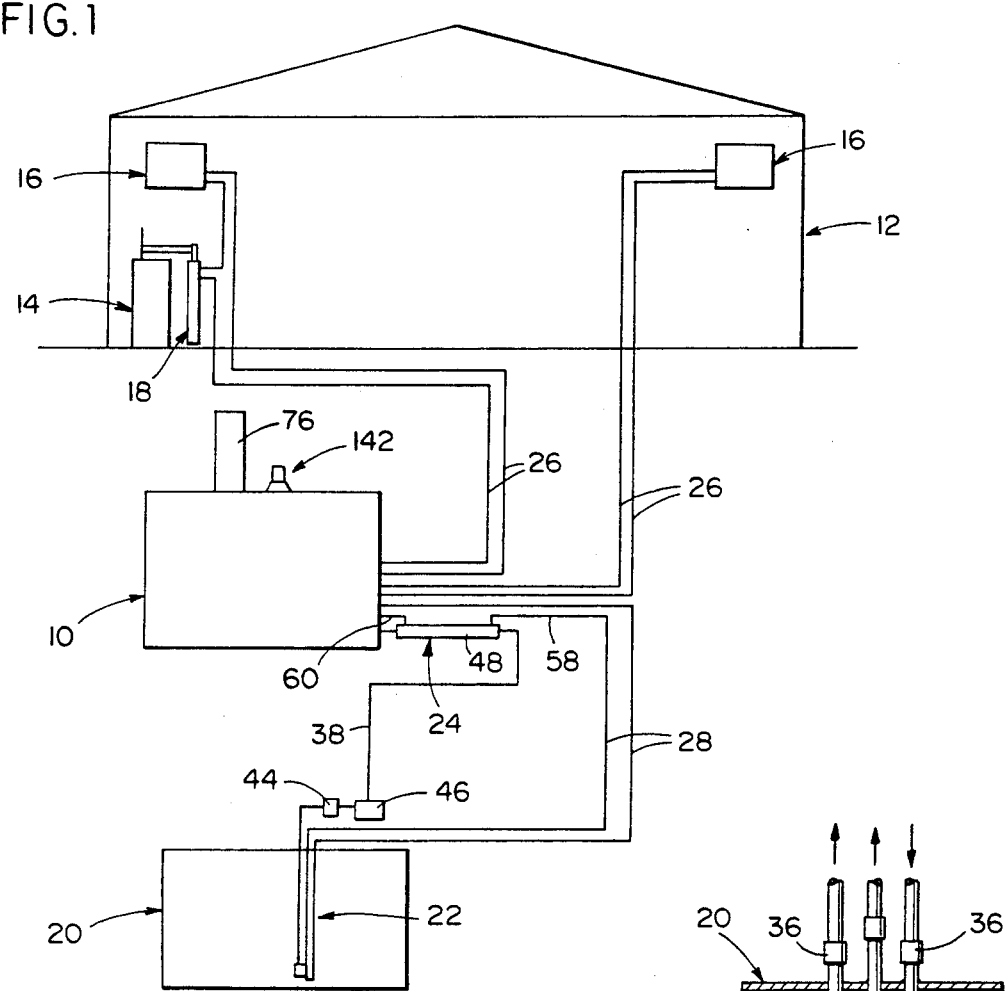
FIG. 1 is a schematic illustration of the outside waste oil furnace of the present invention illustrating its association with a storage tank, preheaters, domestic hot water heater system for a building and fan coil units for building.

Referring now specifically to the drawings, there is disclosed a heating system which includes an outside waste oil furnace 10 associated with a building 12 having a domestic hot water heater 14 associated therewith and one or more fan coil heating units 16 located within the building or other enclosure in order to heat the interior of the building or enclosure. A heat exchanger 18 is provided to heat the water in the domestic hot water heater 14. Also, the furnace 10 is associated with an oil storage tank 20 preferably located above ground with the tank including an oil warmer or preheater 22 as well as an in-line oil preheater 24 located adjacent the furnace 10.

The furnace 10 is connected to the heat exchanger 18 and fan coil units by pipes or conduits 26 to enable circulation of water from and to these units. Also, the furnace is communicated with the preheaters 22 and 24 by pipes or conduits 28 by which hot water can be circulated from and to the furnace and preheaters.

Figure 5:
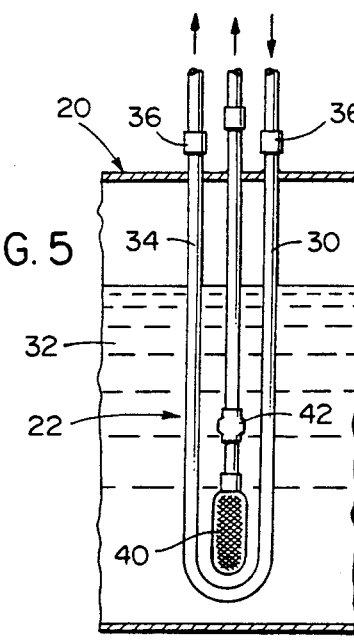
FIG. 5 is a sectional view illustrating the oil warmer or preheater located in the oil storage tank.
Figure 6:
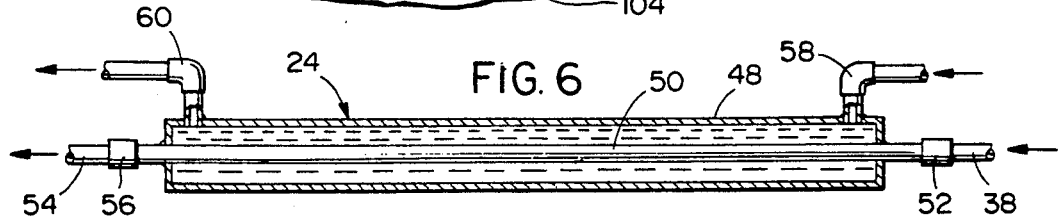
FIG. 6 is a sectional view illustrating the in-line preheater in the oil supply line between the tank and furnace.

FIG. 1 schematically illustrates the preheater 22 in the tank 20 and FIG. 5 illustrates additional details thereof in which a water inlet pipe 30 extends downwardly into the tank in the shape of a U-shaped coil or the coil may be a spiral unit immersed in the waste oil 32 in the tank 20. A return water line 34 extends upwardly through the top wall of the tank as illustrated in FIG. 5 with the pipes 30 and 34 being connected with the pipes 28 by couplings 36 or by any other means. An oil supply pipe 38 extends downwardly through the top of the tank 20 and terminates in a screened inlet 40 located between the U-shaped curvature joining the pipes 30 and 34. A foot valve 42 may be provided in the oil supply pipe 38 adjacent the inlet 40. An oil filter 44 is incorporated into the oil supply line 38 on the inlet side of an oil pump 46 which discharges oil 32 from the tank 20 into the end of preheater 24 as illustrated in FIG. 6.

The preheater 24 includes a cylindrical shell 48 having a central pipe 50 extending therethrough which is connected to the oil supply pipe 38 by a coupling 52 of any suitable construction with the pipe 50 also being connected at its discharge end to an oil supply pipe 54 through a coupling 56. FIG. 6 also illustrates the water circulating inlet pipe 58 connected with the furnace and the water outlet 60 connected with a water pipe 28 which extends to and is connected with the pipe 30 of oil warmer or preheater 22 in the tank 20 with the other pipe 34 being connected to the pipe 28 for return to the furnace.

With the preheater or warmer 22 and the preheater 24 installed, hot water produced by the outside waste oil furnace will first heat the oil in the preheater 24 by flow of water through the heat exchanger shell 48 in relation to the oil flow path through the pipe 50 thus efficiently preheating the oil just prior to it being introduced into the furnace. The water discharged from the preheater 24 then passes through the pipes 30 and 34 and back to the furnace with the pipes 30 and 34 forming a warmer for the oil 32 to reduce the viscosity thereof for more effective operation of the oil filter and oil pump.

The system illustrated in FIG. 1 includes the heat exchanger 18 which receives hot water from a circulating pipe 26 and includes an internal heat exchange structure to transfer heat to domestic hot water in the heater 14 in order to provide a supply of domestic hot water. The hot water exits from the heat exchanger 18 and then extends to on of the fan coil units 16 and returns to the furnace. The fan coils units can also be directly connected to the furnace as also illustrated in FIG. 1 so that the fan coil units can heat the interior of the building or other enclosed space. The specific details of the fan coil units are not shown since they are conventional as is the heat exchanger associated with the hot water from the furnace and the water in the domestic hot water heater.

The structure of the furnace is illustrated in more detail in FIGS. 2 and 3 and includes an outer wall 62 and an inner wall 64 spaced therefrom with insulating material 66 filling the space between the walls 62 and 64. The overall shape of the furnace can vary but preferably is of rectangular configuration with the walls being constructed of suitable sheet metal with the insulation being suitable fiberglass insulation. Interiorly of the inner wall 64, a water tank 68 is provided to form a water jacket around an interior combustion chamber and heat exchanger flue assembly generally designated by reference numeral 70 by which heat from the combustion products can be transferred into water 72 contained in the water jacket between the water tank 68 and the assembly 70. The assembly 70 includes an outlet 74 communicated with an exhaust stack or chimney 76 which extends through the outer wall 62, insulation 66, inner wall 64, water tank 68, water 70 and to the interior of the assembly 70 as illustrated in FIG. 2 by which products of combustion can be discharged to the atmosphere. The stack 76 may be of any suitable height depending upon the installational requirements and extends through an adapter 78 which includes a peripheral wall engaged with the stack 76 and which extends through the walls to the interior of the water tank 68.

The combustion chamber and heat exchanger flue assembly 70 includes a lower inner wall 82 forming the interior of the lower portion of the water jacket in contact with the water 72. The assembly 70 includes a top wall 84, side walls 86, rear end wall 88 remote from a burner unit generally designated by reference numeral 90 thus defining a combustion chamber 92 having a generally cylindrical or oval-shaped longitudinally extending wall 94 therein which extends substantially between the side walls 86 and between the bottom wall 82 and top wall 84 but in spaced relation to each of the walls and in spaced relation to the rear wall 88 to enable combustion products to discharge from the combustion chamber 92 upwardly through an opening 96 disposed at the rear of the combustion chamber 92 and to one side thereof as illustrated in FIG. 3. The combustion products are discharged into a longitudinally extending heat exchanger 98 including an outer vertical side wall 100, a rear wall 102, a top wall 104, a bottom wall 106 and a partial inner wall 108 which extends forwardly from the rear wall 102 to a cross over opening 110 for discharge of combustion products into a flue heat exchanger generally designated by reference numeral 112 which includes an outer wall 114, a rear wall 116, a partial inner wall 118, a bottom wall 120 and a top wall 122 communicated with the stack 76 at the rear end thereof. As illustrated in FIG..2, the top wall 84 of the combustion chamber and the bottom wall 120 of the flue heat exchanger 112 are spaced apart to receive water 72 therebetween to increase the surface area contact between the water in the water jacket and the hot surfaces of the combustion chamber 92 and flue heat exchanger 112. Likewise, the area of the flue heat exchanger 98 between the bottom wall 106 and the top wall 84 of the combustion chamber are spaced apart so that water is in heat exchange contact with these areas. The inner walls 108 and 118 of the flue heat exchangers 98 and 112 are spaced apart to receive water from the water jacket and the top and bottom walls of the flue heat exchangers 98 and 112 include a peripheral offset channel 12 which also forms part of the water jacket. The periphery of the ends of the combustion chamber and flue heat exchangers at the front end thereof includes an inwardly offset channel 126 which also is in communication with the water in the water jacket and the offset channel 124 between the flue heat exchangers 98 and 112 is also provided with a hollow vertical member 128 in communication with the water chamber. These structural features increase the surface area of contact between the water 72 and the heated surfaces of the combustion chamber 92 and the flue heat exchangers 98 and 112. The two flue heat exchangers 98 and 112 include a pivoted insulated access door 130 to provide access to the interior of the flue heat exchangers 98 and 112 and a similar access door is provided for the combustion chamber with the oil burner unit 90 being mounted on the lower door which forms a closure for the combustion chamber. This enables clean-out of the combustion chamber as well as the flue heat exchangers. The door 130 is provided with an inner wall structure 132 engaging with an internal flange 134 on the flue heat exchangers to provide a good seal for the door 130 and to provide a surface for impingement of hot gases as they pass forwardly in the flue heat exchanger 98 and crossover through crossover opening 110. Both ends of the furnace 10 includes removable end walls 136 and 138 to provide access to the burner unit 90 and access to controls and pump units 140 to provide for proper operation of the furnace.

Figure 4:
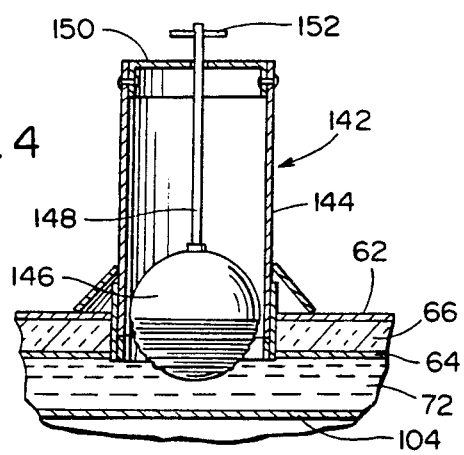
FIG. 4 is a fragmental sectional view of the condenser tank positioned on top of the furnace.

The outer wall 62 includes a condenser tank 142 in the top wall portion adjacent to but spaced from the stack 76 as illustrated in FIG. 1. FIG. 4 illustrates the details of the condenser 142 which includes a cylindrical wall 144 communicated with the water jacket defined by the inner wall 64 and the top wall 104 of the flue heat exchanger 98. A float in the form of a hollow ball 146 is positioned in the cylindrical member 144 and includes a guide rod 148 extending upwardly through a closure cap 150 in the upper end of the cylindrical member 144. A transverse indicator member 152 is connected to the upper end of the rod 148. The condenser tank 142 serves three functions which are to indicate the proper water level by the position of the upper end of the rod 148 and the indicator 152 thereon and the condenser tank is the vent for the hot water system which does not allow pressurization of the water jacket and hot water vapor collects in the condenser tank and the ambient air cools and condenses the hot water vapor so that it can return to the water jacket. The condenser tank, stack and other components in contact with combustion gases or water are preferably constructed of stainless steel.

The arrangement of the flue heat exchangers or heat recovery chambers and combustion chamber or oil burning chambers may be varied and changed in size and configuration to vary the heat output generated by the furnace depending upon the installational requirements. The use of the condenser tank as a vent of the water system provides a non-pressurized water tank thereby eliminating safety controls normally provided in a furnace or boiler. As indicated, dimensional characteristics may be varied but in one installation, the stack is an 8" cylindrical member of stainless steel having a length of 4'. The furnace itself is approximately 30" wide, 32" high and 76" long with fiberglass insulation being used to surround the water tank to prevent heat loss from the water and to provide a weatherproof enclosure for the oil burner, water pumps and controls. The burner is a commercially available burner capable of burning No. 2 and No. 4 fuel oil, used crankcase oil up to SAE 50 and used automatic transmission fluid for producing approximately 280,000 to 350,000 btu's/hour and consume approximately 2 and ½ gallons of oil/hour. Standard controls are provided to control operation of the burner, water pumps, oil pumps and temperature control and water level controls with an electrical supply being provided to the components in accordance with electrical code requirements.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An outside waste oil furnace system comprising a furnace having a combustion chamber, a heat exchange area and an exhaust means, a water jacket associated with said heat exchange area to heat water within the water jacket, burner means associated with said combustion chamber, said water jacket adapted to be communicated with heat exchange devices remote from the furnace, a waste oil storage tank adjacent said furnace, pump means for discharging waste oil from the storage tank into said burner means and oil preheating means between the pump means and burner means for preheating oil for better combustion by the burner means, and means circulating hot water from the water jacket through the oil preheater means, said furnace combustion chamber being horizontally disposed and provided with an upwardly opening flow passage at an end thereof remote from the burner means, a pair of heat exchange chambers positioned above said combustion chamber and in parallel relation thereto and in parallel relation to each other and being separated by a partial baffle extending from an end of the heat exchange chambers remote from the burner means and terminating in spaced relation to an end of the heat exchange chambers adjacent the burner means to form a passage between the heat exchange chambers, said opening in the combustion chamber communicating with one of said heat exchange chambers in remote relation to the burner means, said exhaust means including a stack communicated with the other of the heat exchange chambers in remote relation to the opening.

2. The structure as defined in claim 1 wherein said preheating means includes a cylindrical shell having a water inlet and a water outlet communicated with the water jacket, a heat exchange tube extending through the shell and including an oil inlet at one end and an oil outlet at the other end to enable the pump means to pump oil therethrough and to be heated for discharge into the burner means.

3. The structure as defined in claim 1 together with an oil warmer positioned adjacent the bottom interior of the storage tank to heat oil prior to the oil entering said pump means to facilitate the pump means conveying the oil to said preheating means and burner means, said warmer including a generally U-shaped heat exchange tube extending downwardly from the top of the storage tank to a point adjacent the bottom thereof with the upper ends of the heat exchange tube extending through and being rigidly connected to the storage tank and communicated with the water jacket for warming the oil in the storage tank, said pump means including a screened inlet between the heat exchange tubes adjacent the bottom of the tank.

4. The structure as defined in claim 1 wherein said water jacket encloses the combustion chamber and heat exchange chambers, and an insulated casing enclosing said water jacket.

5. The structure as defined in claim 1 together with a condenser tank projecting upwardly from said furnace with the condenser tank being in communication with said water jacket for receiving water vapor from the water jacket as a result of elevated temperature produced by combustion of waste oil.

6. An outside waste oil furnace system comprising a furnace having a combustion chamber, a heat exchange area and an exhaust means, a water jacket associated with said heat exchange area to heat water within the water jacket, burner means associated with said combustion chamber, said water jacket adapted to be communicated with heat exchange devices remote from the furnace, a waste oil storage tank adjacent said furnace, pump means for discharging waste oil from the storage tank into said burner means and oil preheating means between the pump means and burner means for preheating oil for better combustion by the burner means, and means circulating hot water from the water jacket through the oil preheater means, a condenser tank projecting upwardly from said furnace with the condenser tank being in communication with said water jacket for receiving water vapor from the water jacket as a result of elevated temperature produced by combustion of waste oil, said condenser tank including a cylindrical member having a closure at the upper end thereof, a float movable in the cylindrical member and engaging water in the water jacket, and an indicator extending upwardly from the float to a point exteriorly of the condenser tank to indicate the water level in the water jacket.

7. The structure as defined in claim 6 together with fan coil units communicated with the water jacket for receiving heated water therefrom with the fan coil units being located in a building in order to heat the building.

8. The structure as defined in claim 7 together with a domestic hot water heater and a heat exchanger associated with the water in the domestic hot water heater, said heat exchanger being communicated with the water jacket to indirectly heat water in the domestic hot water heater.

9. The structure as defined in claim 5 wherein said preheating means includes a cylindrical shell having a water inlet and a water outlet communicated with the water jacket, a heat exchange tube extending through the shell and including an oil inlet at one end and an oil outlet at the other end to enable the pump means to pump oil therethrough and to be heated for discharge into the burner means.

10. The structure as defined in claim 5 together with an oil warmer positioned adjacent the bottom interior of the storage tank to heat oil prior to the oil entering said pump means to facilitate the pump means conveying the oil to said preheating and burner means, said warmer including a generally U-shaped heat exchange tube extending downwardly from the top of the storage tank to a point adjacent the bottom thereof with the upper ends of the heat exchange tube extending through and being rigidly connected to the storage tank and communicated with the water jacket for warming the oil in the storage tank, said pump means including a screened inlet between the heat exchange tubes adjacent the bottom of the tank.

11. The structure as defined in claim 6 wherein said furnace combustion chamber is horizontally disposed and provided with an upwardly opening flow passage at an end thereof remote from the burner means, a pair of heat exchange chambers positioned above said combustion chamber and in parallel relation thereto and in parallel relation to each other and being separated by a partial baffle extending from an end of the heat exchange chambers remote from the burner means and terminating in spaced relation to an end of the heat exchange chambers adjacent the burner means to form a passage between the heat exchange chambers, said opening in the combustion chamber communicating with one of said heat exchange chambers in remote relation to the burner means, said exhaust means including a stack communicated with the other of the heat exchange chambers in remote relation to the opening.

12. A waster oil furnace system comprising a furnace having a combustion chamber, a heat exchange area and an exhaust means, a water jacket in heat exchange relation with said heat exchange area to heat water within the water jacket, burner means associated with said combustion chamber, said water jacket adapted to be communicated with heat exchange devices remote from the furnace, a waste oil storage tank adjacent said furnace, pump means for discharging waste oil from the storage tank into said burner means and oil preheating means between the pump means and burner means for preheating oil for better combustion by the burner means, and means circulating hot water from the water jacket through the oil preheater means, a condenser tank projecting upwardly from said furnace with the condenser tank being in communication with said water jacket for receiving water vapor from the water jacket as a result of elevated temperature produced by combustion of waste oil and condensing said water vapor for return to said water jacket, said condenser tank including a cylindrical member having a closure at an upper end thereof, a float movable in the cylindrical member and engaging water in the water jacket, and an indicator extending upwardly from the float to a point exteriorly of the condenser tank to indicate the water level in the water jacket.

* * * * *